Sept. 3, 1957 E. G. WHEALTON 2,804,819
HOT-DOG BROILER FOR COOKING HOT-DOGS
OVER AN OPEN FIRE
Filed Aug. 18, 1955 2 Sheets-Sheet 1
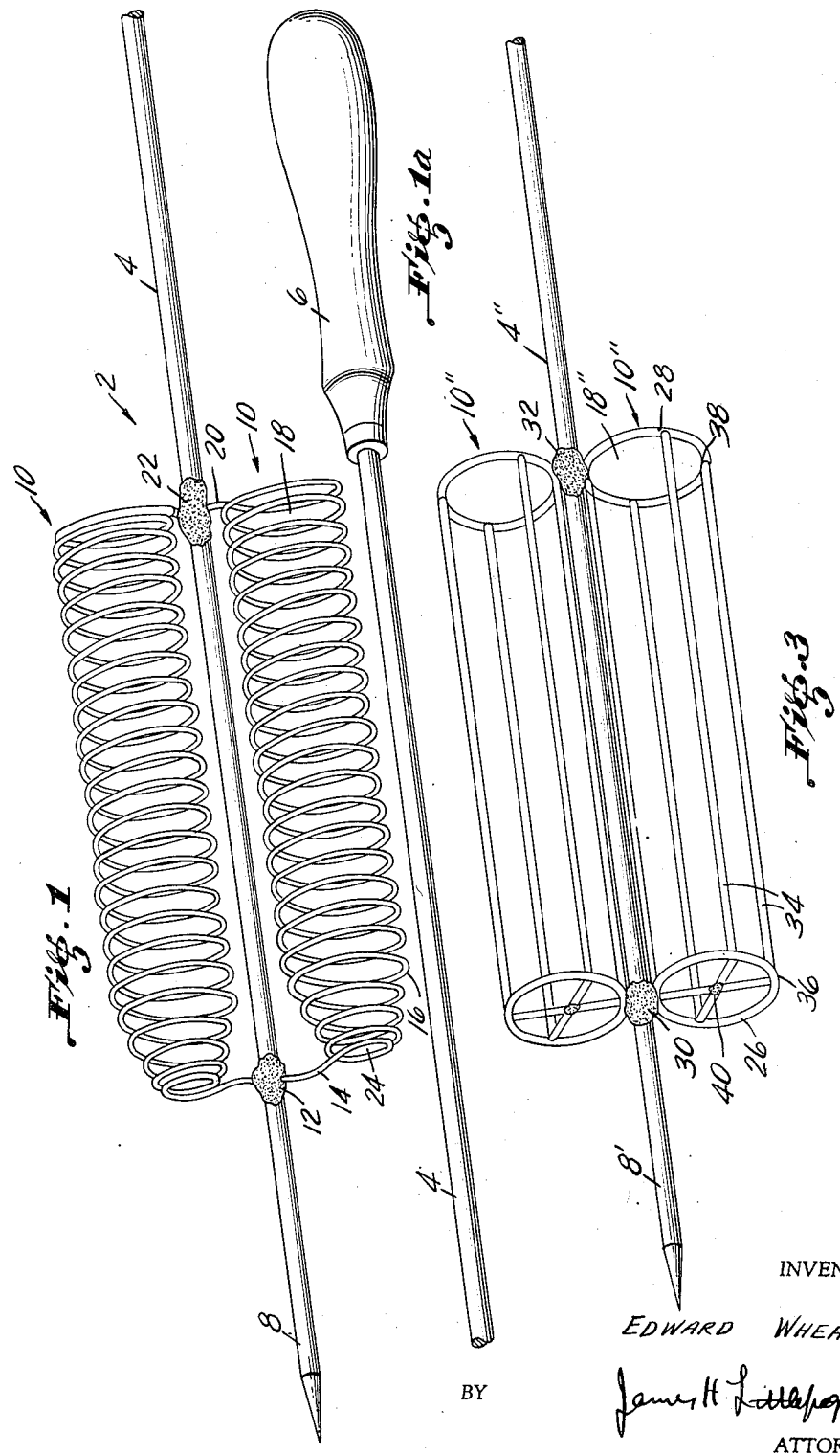
INVENTOR
EDWARD WHEALTON
BY
ATTORNEY Sept. 3, 1957   E. G. WHEALTON   2,804,819
HOT-DOG BROILER FOR COOKING HOT-DOGS
OVER AN OPEN FIRE
Filed Aug. 18, 1955   2 Sheets-Sheet 2
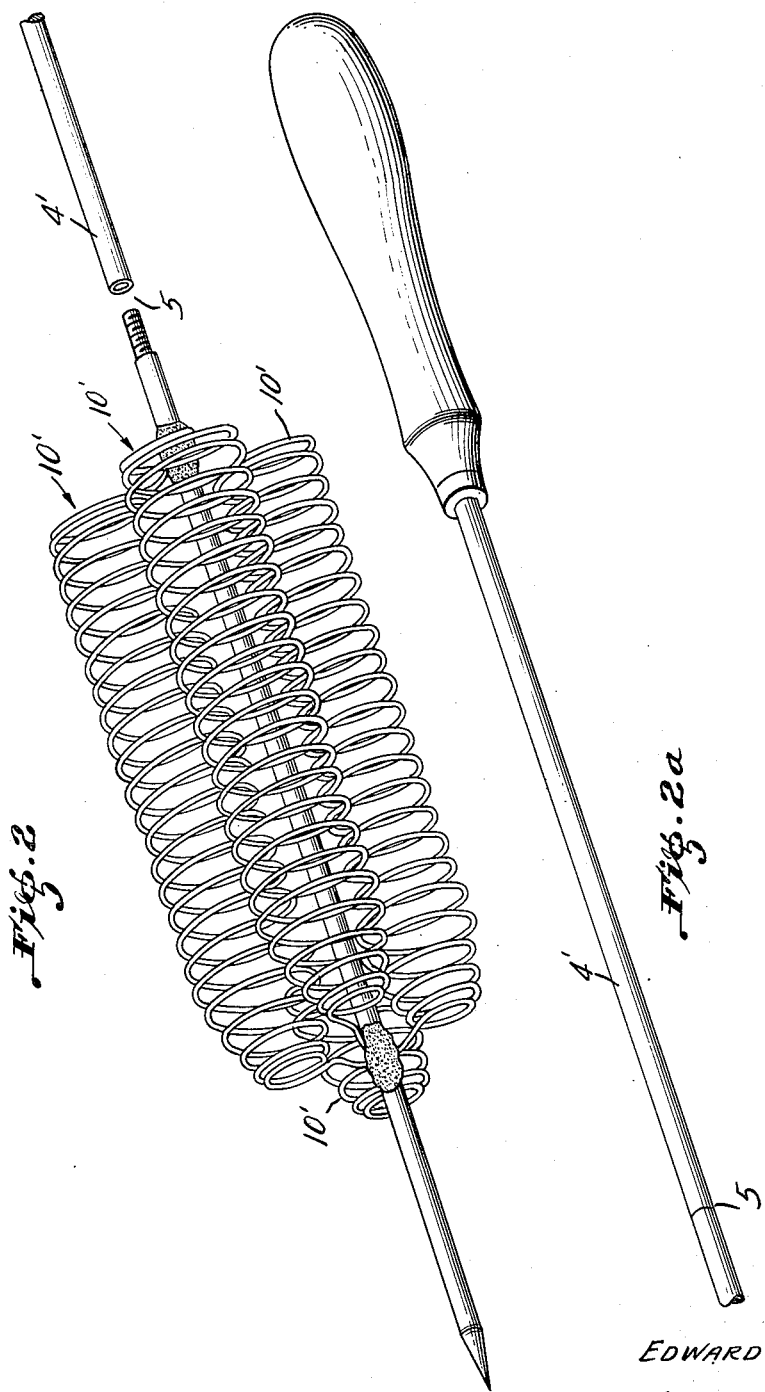
INVENTOR
EDWARD WHEALTON
BY
ATTORNEY

United States Patent Office 2,804,819
Patented Sept. 3, 1957

2,804,819

HOT-DOG BROILER FOR COOKING HOT-DOGS OVER AN OPEN FIRE

Edward G. Whealton, Norfolk, Va.

Application August 18, 1955, Serial No. 529,259

2 Claims. (Cl. 99—441)

This invention relates to confining supports for elongate or sausage shaped articles and, more particularly, to rod-supported spiral baskets for broiling hot-dogs.

The object of the invention is to provide a hot-dog broiler for cooking hot-dogs over an open fire. According to this invention, by means of which the food is manually supported near the remote duct of a long rod-like handle, several features contribute to the attainment of well-done food free of contamination by ashes or dirt. It is intended, first, that the hot dogs be supported so that they can be completely exposed to the heat and rays of the fire, without danger of dislodgement from the support, but that they nevertheless be easily removable from the support when done. Another objective is the provision of means for resting the free end of a supporting handle, i. e., the end beyond the food basket, on the wood or burning coals of a fire, whereby the food may be maintained steadily at a predetermined distance from the fire, and whereby the food may be slowly turned to expose it completely to the coals, all without the fatigue and unsteady support ordinarily resulting from supporting a hot dog on the remote end of a long stick.

Another object is to provide a spike-supported food basket wherein the spike extends for a substantial distance beyond the basket whereby, when the device is not in use, it can be supported upright by jamming the spike into the ground, thereby supporting the basket above the ground. By this means, the basket is kept free from the grit and dirt which it would otherwise collect were it rested directly on the ground.

Still another object is the provision of a broiler which can be easily manufactured and sold at reasonable cost.

These and other objects will be apparent from the following specification and drawings, in which:

Figs. 1 and 1a are a perspective view showing one form of the invention;

Figs. 2 and 2a are a perspective view showing a modified form; and,

Fig. 3 is a perspective view showing a third form of the invention.

Referring now to the drawings, in which like reference numerals denote similar elements, and prime numerals denote elements previously described and designated with whole numerals the broiler 2 shown in Figs. 1 and 1a is formed of an elongate rigid rod 4 having a handle 6 affixed at one end. The other end of the rod is tapered so as to constitute a spike end 8. Adjacent the spike end of rod 4 are a pair of food baskets 10. Since baskets 10 are identical, only one will be described in detail. Each basket 10 is formed of wire welded at 12 to rod 4, thence extending outwardly from the rod as denoted at 14, thence being spirally bent as shown at 16 to provide the cylindrical portion 18 of the basket, thence having a portion 20 extending inwardly at the upper end of the basket and welded at 22 to rod 4. Food baskets 10 are substantially identical and preferably of reduced diameter at the ends 24 thereof disposed towards the spike end 8 to prevent the food from falling through. The wire 12 should be sufficiently resilient so that, when the rod is struck against the ground or some solid object, the food baskets 10 will resonate so as to shake loose foreign matter or charred bits of food stuck thereto.

The broiler 2' shown in Fig. 2 is similar to the one previously detailed, except in that rod 4' has threaded joints 5 so that the broiler may be compactly handled, and four baskets 10 are arranged ninety degrees apart around rod 4'.

In the embodiment illustrated in Fig. 3, baskets 10" of broiler 2" are each comprised of a pair of rings 26, 28 affixed respectively on opposite sides of rod 4" by welds 30, 32. The cylindrical portion 18" of the baskets are formed by straight wires 34 welded at their ends 36, 38 to rings 26 and 28. Cross wires 40 may be welded across the lower rings 26 to prevent accidental dropping of the food or, alternatively, the lower rings may be of reduced diameter. While the baskets, in the forms shown, are dimensioned for hot dogs, it will be apparent to those skilled in the art that they may be made of suitable size for roasting ears of corn or other elongate objects of various diameters and lengths.

I claim:

1. A device for broiling elongate articles over an open fire, comprising an elongate rigid rod having a handle at one end thereof, the other end of said rod being tapered and constituting a spike, and a plurality of food baskets respectively along opposite sides said rod adjacent the spike end thereof, said food baskets each being substantially cylindrical and formed of a length of bent wire welded to said rod, thence extending outwardly from the rod, thence being spirally bent to form the cylindrical portion of the basket, and thence extending inwardly and being welded to said rod.

2. The combination claimed in claim 1, each of said food baskets being reduced in diameter at the end thereof nearest the spike.

References Cited in the file of this patent

UNITED STATES PATENTS

| | | |
|---|---|---|
| 1,787,469 | Blier | Jan. 6, 1931 |
| 2,136,658 | Westberg | Nov. 15, 1938 |
| 2,189,047 | Tolen | Feb. 6, 1940 |
| 2,566,524 | Kammins | Sept. 4, 1951 |
| 2,649,042 | Wickman | Aug. 18, 1953 |